(12) United States Patent
Amann et al.

(10) Patent No.: US 9,680,920 B2
(45) Date of Patent: Jun. 13, 2017

(54) ANTICIPATORY RESOURCE ALLOCATION/ACTIVATION AND LAZY DE-ALLOCATION/DEACTIVATION

(71) Applicant: International Business Machines Corporation, Armonk, NY (US)

(72) Inventors: Stefan Amann, Boeblingen (DE); Gerhard Banzhaf, Nufringen (DE); Joseph M. Gdaniec, Cary, NC (US); James M. Jenks, Vestal, NY (US); Angel Nunez Mencias, Stuttgart (DE); Eric A. Weinmann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 14/479,562

(22) Filed: Sep. 8, 2014

(65) Prior Publication Data
US 2016/0072725 A1 Mar. 10, 2016

(51) Int. Cl.
*G06F 9/46* (2006.01)
*H04L 29/08* (2006.01)
(Continued)

(52) U.S. Cl.
CPC ............. *H04L 67/10* (2013.01); *G06F 9/50* (2013.01); *G06F 9/505* (2013.01); *G06F 9/5044* (2013.01); *H04L 47/762* (2013.01); *G06F 9/5027* (2013.01)

(58) Field of Classification Search
CPC ............................................. G06F 9/50–9/548
See application file for complete search history.

(56) References Cited

U.S. PATENT DOCUMENTS 5,109,510 A * 4/1992 Baker .................. G06F 9/4443
  718/104
7,249,179 B1 * 7/2007 Romero ............... G06F 9/5083
  709/221

(Continued)

FOREIGN PATENT DOCUMENTS

CN 103309745 A 9/2013
JP 5284809 B2 9/2013

OTHER PUBLICATIONS

Venkatasubramanian, Nalini, et al., "Load Management in Distributed Video Servers", 1997, pp. 528-535.*
(Continued)

*Primary Examiner* — Thuy Dao
*Assistant Examiner* — Christopher Franco
(74) *Attorney, Agent, or Firm* — John W. Hayes; William H. Hartwell

(57) ABSTRACT

A computer-implemented method, carried out by one or more processors, for managing resources in a server environment. The method includes determining, by one or more processors, to shut down a first resource consumer, wherein the first resource consumer is assigned a first virtual resource with a first set of one or more host resources. It is determined, by one or more processors, whether a second virtual resource assigned to a second resource consumer requires the first set of one or more host resources. If the second virtual resource assigned to the second resource consumer does not require the first set of one or more host resources, it is determined, by one or more processors, not to deactivate the one or more host resources assigned to the first virtual resource.

10 Claims, 5 Drawing Sheets

(51) Int. Cl.
*H04L 12/923* (2013.01)
*G06F 9/50* (2006.01)

(56) References Cited

U.S. PATENT DOCUMENTS

| | | | | |
|---|---|---|---|---|
| 7,451,183 | B2* | 11/2008 | Romero | G06F 9/5077 709/201 |
| 7,703,102 | B1* | 4/2010 | Eppstein | G06F 9/5011 718/104 |
| 8,104,039 | B2* | 1/2012 | Huizenga | G06F 9/5011 709/223 |
| 8,365,182 | B2 | 1/2013 | Groetzner et al. | |
| 8,429,276 | B1 | 4/2013 | Kumar et al. | |
| 8,468,535 | B1 | 6/2013 | Keagy et al. | |
| RE44,686 | E | 12/2013 | Keshav et al. | |
| 9,210,065 | B2* | 12/2015 | Hao | G06F 9/45558 |
| 9,400,689 | B2 | 7/2016 | Banzhaf et al. | |
| 9,405,581 | B2 | 8/2016 | Banzhaf et al. | |
| 2004/0199632 | A1* | 10/2004 | Romero | G06F 9/5077 709/226 |
| 2007/0028244 | A1 | 2/2007 | Landis et al. | |
| 2008/0034370 | A1* | 2/2008 | Huizenga | G06F 9/5011 718/104 |
| 2008/0123559 | A1 | 5/2008 | Haviv et al. | |
| 2008/0320153 | A1* | 12/2008 | Douville | H04L 45/02 709/229 |
| 2009/0307308 | A1 | 12/2009 | Siegemund et al. | |
| 2010/0293544 | A1 | 11/2010 | Wilson et al. | |
| 2010/0322255 | A1* | 12/2010 | Hao | G06F 9/45558 370/398 |
| 2011/0022812 | A1 | 1/2011 | Van Der Linden et al. | |
| 2012/0110164 | A1 | 5/2012 | Frey et al. | |
| 2012/0204187 | A1 | 8/2012 | Breiter et al. | |
| 2012/0297016 | A1* | 11/2012 | Iyer | G06F 9/5072 709/217 |
| 2013/0031559 | A1 | 1/2013 | Alicherry | |
| 2013/0198386 | A1 | 8/2013 | Srikanth et al. | |
| 2013/0198743 | A1 | 8/2013 | Kruglick | |
| 2013/0263117 | A1 | 10/2013 | Konik et al. | |
| 2013/0318134 | A1 | 11/2013 | Bolik et al. | |
| 2014/0007097 | A1 | 1/2014 | Chin et al. | |
| 2014/0032761 | A1 | 1/2014 | Beveridge | |
| 2014/0282525 | A1 | 9/2014 | Sapuram et al. | |
| 2014/0365662 | A1 | 12/2014 | Dave et al. | |
| 2015/0113144 | A1 | 4/2015 | Bauer et al. | |
| 2015/0163157 | A1 | 6/2015 | Hao et al. | |
| 2015/0350103 | A1* | 12/2015 | Bertram | G06F 9/5061 709/226 |
| 2016/0070586 | A1 | 3/2016 | Banzhaf et al. | |
| 2016/0072719 | A1 | 3/2016 | Banzhaf et al. | |
| 2016/0072724 | A1 | 3/2016 | Amann et al. | |
| 2016/0299794 | A1 | 10/2016 | Banzhaf et al. | |

OTHER PUBLICATIONS

Song, Weijia, et al., "Chapter 13—An Infrastructre-as-a-Service Cloud: On-Demand Resource Provisioning", 2013, pp. 301-323.*
Senthilvelan, Selvamuthukumar, et al., "Study of Content-Based Sharing on the Xen Virtual Machine Monitor", 2013, pp. 1-10.*
Kokku, Ravi et al., "Adaptive Processor Allocation in Packet Processing Systems", 2010, pp. 1-10.*
Arzuaga, Emmanuel et al., "Increasing Power/Performance Resource Efficiency on Virtualized Enterprise Servers", 2011, pp. 1-2.*
Tsai, Wei-Tek, et al., "Two-Tier Multi-Tenancy Scaling and Load Balancing", 2010, pp. 484-489.*
Dutta, S et al. "Service Deactivation Aware Placement and Defragmentation in Enterprise Clouds". 7th International Conference on Network and Service Management (CNSM). Publication Year: 2011. pp. 1-9.
Xiao et al. "Dynamic Resource Allocation Using Virtual Machines for Cloud Computing Environment". IEEE Transactions on Parallel and Distributed Systems, vol. 24, No. 6, Jun. 2013. pp. 1107-1117. Copyright IEEE 2013.
"System and method of resource/service provisioning and de-provisioning based on usage patterns in a cloud environment". IP.com No. IPCOM000230775D. IP.com Electronic Publication: Sep. 11, 2013.
"VMware Distributed Resource Scheduler (DRS) Dynamic Load Balancing and Resource Allocation for Virtual Machines". Product Datasheet 1. Copyright 2009 VMware, Inc. Palo Alto, CA.
Appendix P List of IBM Patents or Patent Applications Treated as Related.
Banzhaf, G. et al. U.S. Appl. No. 14/479,430, filed Sep. 8, 2014.
Banzhaf, G. et al. U.S. Appl. No. 14/521,546, filed Oct. 23, 2014.
Amann, S. et al. U.S. Appl. No. 14/521,516, filed Oct. 23, 2014.
Appendix P List of IBM Patents and Applications Treated as Related. Dated Jun. 23, 2016. Two pages.
Banzhaf, G. et al. U.S. Appl. No. 15/187,870, filed Jun. 21, 2016.

* cited by examiner

ANTICIPATORY RESOURCE ALLOCATION/ACTIVATION AND LAZY DE-ALLOCATION/DEACTIVATION

BACKGROUND

In a virtual server environment, resources are typically allocated for utilization by virtual servers and other resource consumers. In a cloud environment, where a large number of virtual servers competing for and sharing common resources is deployed, the frequency of resource allocations and de-allocations is by an order of magnitude higher than in traditional server environments. Additional focus is put on input and output resources, where multiple and often time-consuming actions may be needed to prepare a resource for use by a virtual server. It is desirable that the resource activations and corresponding deactivations be performed in an automated and synchronized manner.

SUMMARY

Embodiments in accordance with the present invention disclose a method, computer program product and computer system for managing resources in a server environment. The method includes determining, by one or more processors, to shut down a first resource consumer, wherein the first resource consumer is assigned a first virtual resource with a first set of one or more host resources. It is determined, by one or more processors, whether a second virtual resource assigned to a second resource consumer requires the first set of one or more host resources. If the second virtual resource assigned to the second resource consumer does not require the first set of one or more host resources, it is determined, by one or more processors, not to deactivate the one or more host resources assigned to the first virtual resource.

DETAILED DESCRIPTION

Embodiments in accordance with the present invention provide demand-based management of resource allocations and activations, as well as resource de-allocations and deactivations. In particular instances, resource allocations and activations are performed in advance to accelerate subsequent virtual server activation. In instances where a virtual server is deactivated, deactivation and de-allocation of virtual server resources is delayed until the resources are called to support another virtual server.

Resource allocation is typically performed on demand when resources are needed to activate a resource consumer or when additional resources are called for an active resource consumer. Correspondingly, resource de-allocation is typically performed when the resource consumer is deactivated. Therefore, on subsequent resource consumer activations, different host resources can be allocated to the virtual resources. Also, the same host resource can be allocated to different virtual resources of the same or different resource consumers at different points in time.

In order to utilize a virtual resource, a resource activation is typically performed. Resource activation actions can include clearing main memory before assignment to a resource consumer, and updating network configuration and storage access to tables in host firmware (i.e., physical server and/or hypervisors). The activation procedure can depend on a virtualization type, where the virtualization type is how the host resource is virtualized so that, for instance, a single physical host resource represents multiple virtualized host resources. The activation procedure can also depend on where the resource consumer is deployed, more particularly, on which hypervisor level. Activation of both the virtual resource and the assigned host resource allows for resource utilization by server firmware, hypervisors, and privileged operating systems.

Figure 1:
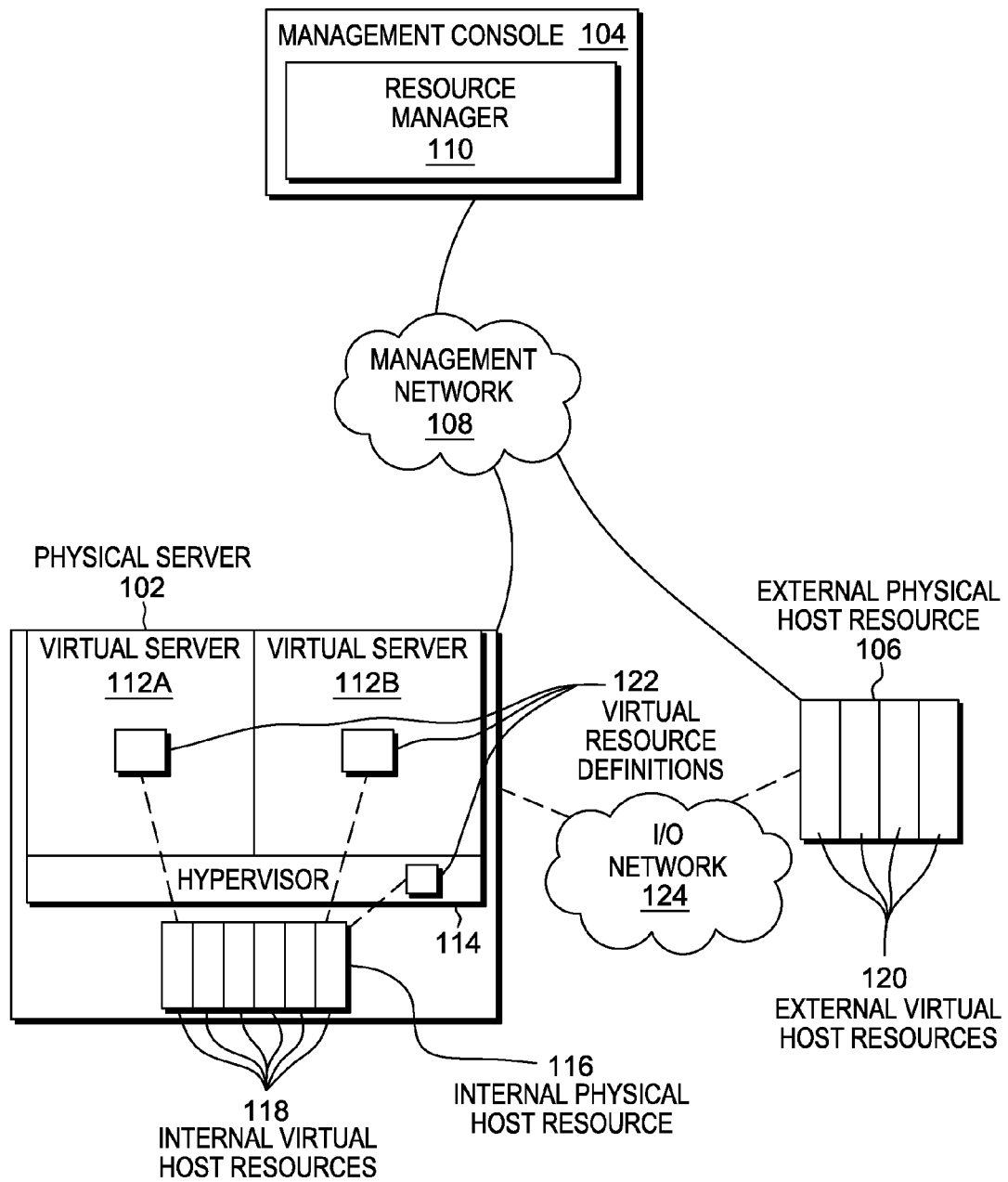
FIG. 1 is a functional block diagram illustrating a distributed data processing environment, in accordance with an embodiment of the present invention.

Example embodiments in accordance with the present invention will now be described in detail with reference to the drawing figures. FIG. 1 is a functional block diagram illustrating a distributed data processing environment, in accordance with one embodiment of the present invention. The distributed data processing environment includes physical server 102, management console 104, and external physical host resource 106, all interconnected over management network 108.

Physical server 102 represents a computer system utilizing clustered computers and components that act as a single pool of seamless resources when accessed through I/O network 124, as is common in data centers and with cloud computing applications. In general, physical server 102 is representative of any programmable electronic device or combination of programmable electronic devices capable of executing machine-readable program instructions and communicating with other computer devices via a network.

Management console 104 manages physical server 102, external physical host resource 106 and the components therein. Management console 104 provides both a graphical user interface (GUI) and application programming interfaces (API) for automated configuration management. Resource manager 110, residing in management console 104, allows for the management of activating and deactivating resources. Resource manager 110 can bundle resource activation steps for two or more resource consumers, where resource manager 110 can perform activation steps in parallel for the two or more resource consumers. Resource manager 110 can also execute activation and deactivation when reassigning host resources.

In this embodiment, hypervisor 114 provides execution environments for multiple virtual servers, such as virtual server 112A and virtual server 112B, to run on physical server 102. In addition to virtual server 112A and 112B, hypervisor 114 can host one or more additional hypervisors not illustrated in FIG. 1. Therefore, virtual server 112A, virtual server 112B, and hypervisor 114 can execute on one or more underlying levels of hypervisors. A server cluster can include one or more physical servers 102, therefore, virtual servers can execute on different nodes (i.e., physical servers) of the server cluster.

Virtual server 112A, virtual server 112B, and hypervisor 114 are resource consumers and each includes virtual resource definitions 122. Virtual resource definitions 122 can include, but are not limited to, processors, memory, and I/O ports. Virtual resources are supported by physical resources, which can exist internally or externally of physical server 102. Typically, external and internal host resources include virtual host resources. For example, virtual processors are based on physical processors and virtual network adapters are based on physical network adapters. Examples of providers for virtualization of host resources can include physical server 102 (hardware and firmware), hypervisor 114, or an independent virtualization entity not illustrated in FIG. 1. In this embodiment, internal physical host resource 116 and external physical host resource 106, respectively, include internal virtual host resources 118 and external virtual host resources 120. I/O network 124 can connect physical server 102 with external physical host resource 106.

In general, management network 108 can be any combination of connections and protocols that can support communications between physical server 102, management console 104, and external physical host resource 106. I/O network 124 can be any combination of connections and protocols that's can support communications between physical server 102 and external physical host resource 106. Typically, management network 108 and I/O network 124 are independent from one and other. Management network 108 and I/O network 124 can include, for example, a local area network (LAN), a wide area network (WAN), such as the internet, a cellular network, or any combination of the preceding, and can further include wired, wireless, and/or fiber optic connections.

Resource allocation (allocation of host resources to virtual resources) and resource activation of both virtual resources and the assigned host resources is typically performed when a resource consumer owning the virtual resources is activated, and when resources are added to an active resource consumer. Resource de-allocation and resource deactivation of both virtual resources and the assigned host resources is typically performed when a resource consumer owning a virtual resource is deactivated, and when resources are removed from an active resource consumer. Typically, the allocation and de-allocation is a one-step operation. However, resource activation and deactivation can consist of multiple steps which affect both the virtual resources and the associated host resources, and depend on the operational state of the resource consumer.

Virtual resources typically exist as part of a resource consumer, more specifically as part of the definitions of the resource consumer. For each type of virtual resource, there is a virtual resource provider managing the virtual resource. For example, a network manager manages communication network ports, or a storage manager manages storage resources and storage network ports. Managing virtual resources includes the activating and deactivating of the virtual resources. Host resources are present when there are underlying physical resources present, and when the virtual entity providing appropriate virtualized host resources is present as well. Host resources can be organized in resource pools from which resource manager 110 can allocate each individual resource. For each type of host resource, there is a host resource provider that manages the host resource.

To avoid unnecessary resource activation and deactivation cycles, as well as to allow resource over-commitment, resource manager 110 performs host resource allocation and host resource activation when a resource consumer is activated and associated host resources are not yet allocated and/or activated. Resource manager 110 also performs host resource allocation and host resource activation when virtual resource definitions are added to an active resource consumer. A user of resource manager 110 can override the allocation and activation with a "resource reserved" attribute setting for the resource consumer.

In the event a resource consumer is set to "resource reserved", resource manager 110 allocates the host resources associated with the resource consumer and host resource activation occurs when resource manager 110 activates the resource consumer. In the event a virtual resource definition is added to the resource consumer that is set to "resource reserved", resource manager 110 allocates the host resources associated with the resource consumer, and if the resource consumer is active, resource manager 110 activates the host resources.

Lazy deactivation of host resources of a resource consumer avoids a resource deactivation cycle, and a subsequent host resource activation cycle, if the same resource consumer is to be activated again shortly thereafter, and if the host resources assigned to a virtual resource have not yet been requested to satisfy requests for host resources of other resource consumers. Lazy de-allocation ensures that the host resources remain allocated to the resource consumer as long as the host resources are not required in support of another resource consumer. Resource manager 110 does not perform host resource de-allocation when the associated resource consumer is marked as "resource reserved", even in cases where the host resources would satisfy an allocation request of another resource consumer.

In other cases, the host resources remain allocated until the host resources are required to satisfy an activation of another resource consumer. Resource manager 110 marks the host resources remaining allocated as "can-be-de-allocated". In the event resource manager 110 utilizes a priority-based allocation strategy, the host resources remain allocated until the host resources are required to satisfy an activation request of another resource consumer, where the other resource consumer has a higher priority. In instances when virtual resource definitions are added to a resource consumer that is active, resource manger 110 allocates and activates the host resources in the same manner as if the resource consumer has just been activated. In instances when virtual resource definitions are removed from an active resource consumer, resource manager 110 deactivates and de-allocates the host resources, so the host-resources become available for other resource consumers.

Figure 2:
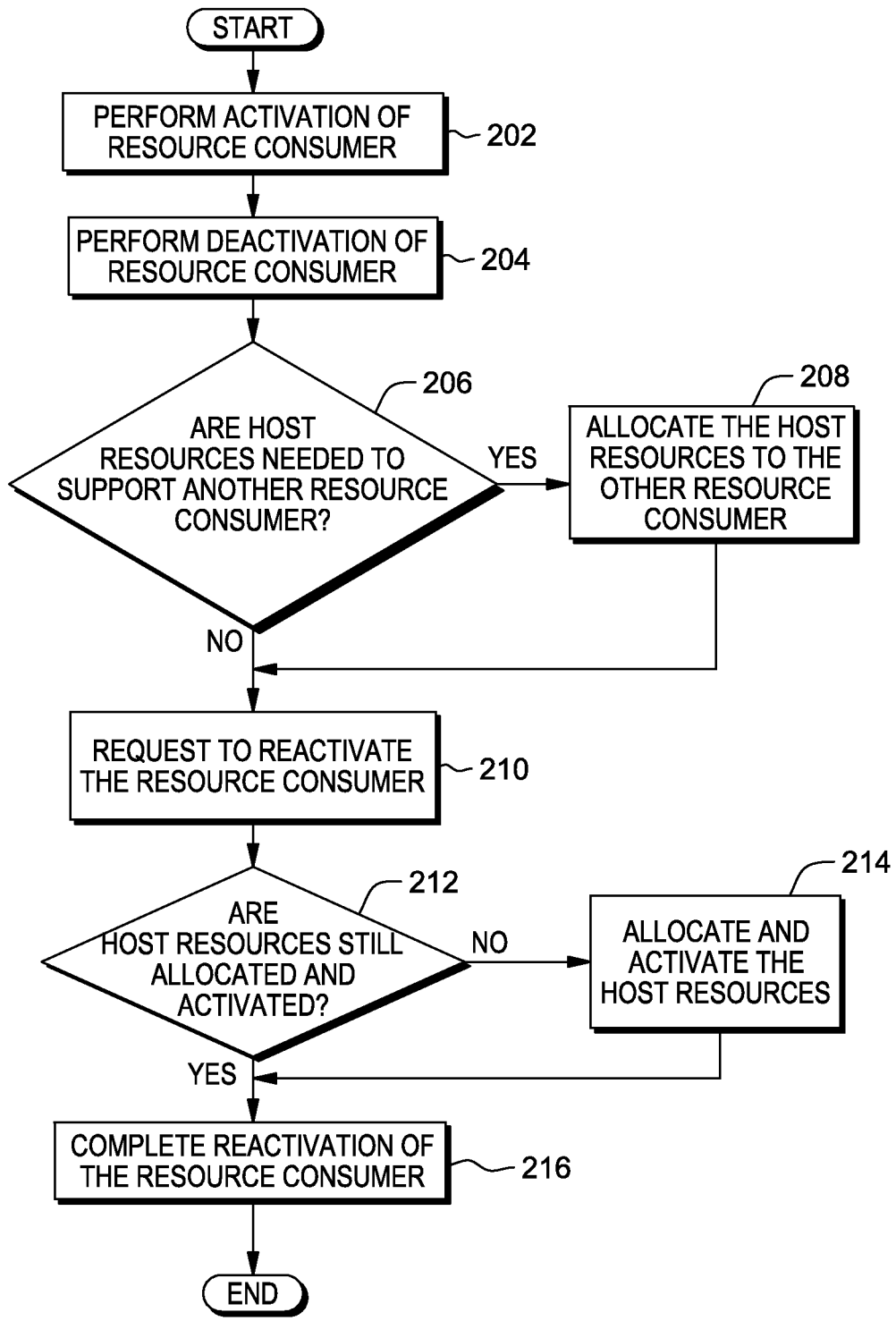
FIG. 2 is a flowchart depicting operational steps of a resource manager for recurring activation of resource consumers, in accordance with an embodiment of the present invention.

FIG. 2 is a flowchart depicting operational steps of a resource manager for recurring activation of resource consumers, in accordance with an embodiment of the present invention.

Resource manager 110 performs activation of a resource consumer (step 202). In this embodiment, resource manager 110 activates a resource consumer, where the activation of the resource consumer includes the allocation and activation of host resources. The resource consumer can utilize the host resources until resource manager 110 performs a deactivation of the resource consumer.

Resource manager 110 performs deactivation of the resource consumer (step 204). In this embodiment, resource manager 110 deactivates the resource consumer but the host resources remain activated and allocated to the resource consumer. As a result, resource manager 110 does not have to go through additional deactivation/activation cycles for the host resources allocated to the resource consumer.

Resource manager 110 determines if the host resources are needed to support another resource consumer (decision step 206). In the event resource manager 110 determines the host resources are needed to support another resource consumer ("yes" branch, step 206), resource manager 110 allocates host resources to the other resource consumer (step 208). In the event resource manager 110 determines the host resources are not needed to support another resource consumer ("no" branch, step 206), resource manager 110 requests to reactivate the resource consumer (step 210).

Resource manager 110 allocates host resources to the other resource consumer (step 208). In this embodiment, resource manager 110 allocates the host resource of the initial resource consumer to the other resource consumer. Resource manager 110 does not have to re-activate the host resources since the host resources are already active and allocated to the initial resource consumer. The other resource consumer can utilize the host resources once resource manager 110 allocates the host resources.

Resource manager 110 requests to reactivate the resource consumer (step 210). In this embodiment, resource manager 110 determines the initial resource consumer is to be reactivated. Resource manager 110 requests to reactivate the resource consumer since host resources originally allocated to the resource consumer may be utilized by the other resource consumer as previously discussed in step 208.

Resource manager 110 determines if the host resources are still allocated and activated (decision step 212). In the event resource manager 110 determines the host resources are no longer allocated and activated ("no" branch, step 212), resource manager 110 allocates and activates the host resources (step 214). In the event resource manager 110 determines the host resources are still allocated and activated ("yes" branch, step 212), resource manager 110 completes reactivation of the resource consumer (step 216). If the host resources are still allocated and activated for the other resource consumer, resource manager 110 can de-allocate the host resources from the other resource consumer and allocate the host resources to the initial host resource without going through a deactivation/activation cycle.

Resource manager 110 allocates and activates the host resources (step 214). In this embodiment, resource manager 110 determines that the host resources are no longer being utilized by the other resource consumer and have been de-allocated and deactivated. Resource manager 110 identifies the host resources, allocates, and activates the host resources for the resource consumer being reactivated Resource manager 110 completes reactivation of the resource consumer (step 216). In this embodiment, resource manager 110 finalizes the reactivation of the resource consumer with the allocated and activated host resources.

Figure 3A:
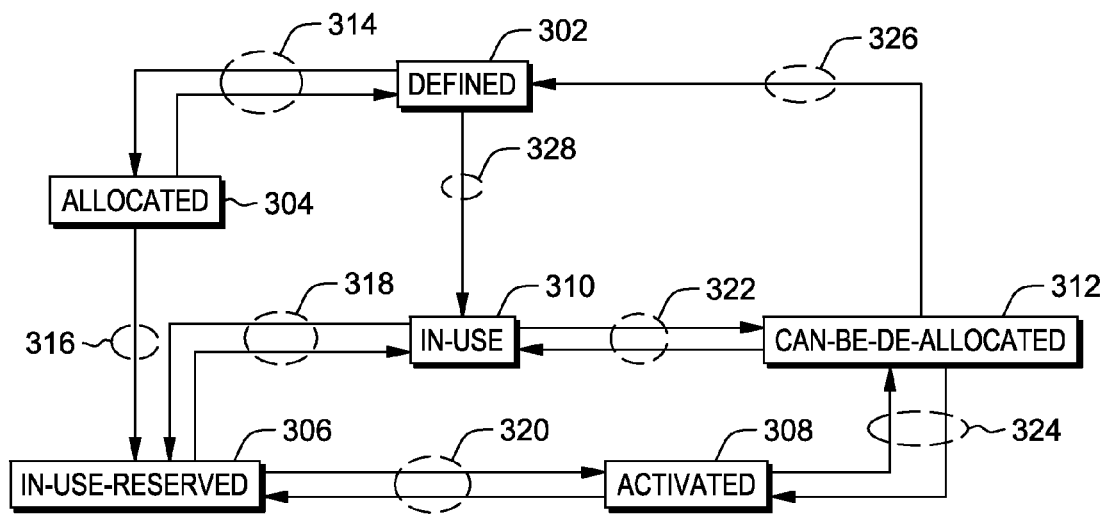
FIG. 3A illustrates a state diagram depicting resource states and state transitions, in accordance with one embodiment of the present invention.

FIG. 3A illustrates a state diagram depicting resource states and state transitions, in accordance with one embodiment of the present invention. The state diagram depicts resource states and state transitions, where resources are allocated but not activated when a resource consumer is started, as well as situations where resources remain activated and allocated when the resource consumer is stopped.

In this embodiment, states and state transitions for the virtual resources of a resource consumer are represented. The states and state transitions represent resource manager 110 performing allocation (without activation) when a resource consumer is set to resource reserved. Resource manager 110 also performs lazy de-allocation and deactivation when a resource consumer is not set to reserved. In instances where a resource consumer is marked as reserved, host resources stay allocated and activated.

Defined 302 represents a state of a host resource which is defined but not allocated to a resource consumer. Allocated 304 represents a state of a resource that is allocated but not activated. In-use 310 and in-use-reserved 306 represent states of a host resource that is activated and is being utilized by an active resource consumer, with the difference being that the host resource is not reserved in the state, in-use 310. However, the host resource is reserved in the state, in-use-reserved 306. Activated 308 and can-be-de-allocated 312 represent states of a host resource that is activated but is not being utilized, since the assigned resource consumer is no longer active. During the state, activated 308, the host resource is reserved and therefore cannot be deactivated and de-allocated. During the state, can-be-de-allocated 312, the host resource is not reserved and therefore eligible for deactivation and de-allocation.

During the state, defined 302, resource manager 110 can set a host resource to reserved, leading to state, allocated 304. Resource manager 110 can also start the host resource causing a transition to the state, in-use 310. During the allocated 304 state, resource manager 110 can reverse the reservation, which leads back to the state, defined 302 or the state, in-use reserved 306, where resource manager 110 can activate the resource consumer to which the host resource is assigned. During the state, in-use 310, resource manager 110 can set the host resource to reserved, leading to the state, in-use-reserved 306. Correspondingly, resource manager 110 can reverse the reservation of a host resource in the state, in-use-reserved 306. This results in a transition to the state, in-use 310. When resource manager 110 stops the resource consumer to which a host resource is assigned, resource manager 110 transfers a resource that is not reserved from the state, in-use 310 to the state, can-be-de-allocated 312. Resource manager 110 transfers a host resource that is reserved from the state, in-use-reserved 306 to the state, activated 308.

Resource manager 110 reversing the reservation of a host resource in the state, activated 308 leads to the state can-be-de-allocated 312, and setting a host resource to reserve in the state, can-be-de-allocated 312 leads to the state, activated 308. From the state, can-be-de-allocated 312, a transition back to the state, defined 302 occurs when the allocated host resources are needed in support of another resource consumer, causing a host resource deactivation and de-allocation. For a subsequent activation of the resource consumer, resource manager 110 performs a resource allocation and activation cycle. However, if the resource is still in one of the states, can-be-de-allocated 312 or activated 308, when the resource consumer is activated, then the host resource is directly transferred back into the state, in-use 310 or in-use-reserved 306.

State transition 314 represents the allocation of host resources (i.e., resource reserve) leading from defined 302 to allocated 304, as well as the de-allocation of host resources (i.e., unreserved resource consumer), leading from allocated 304 to define 302. State transition 316 represents the activation of host resources (i.e., resource consumer startup) leading from allocated 304 to in-use-reserved 306. State transition 328 presents the allocation and activation of the host resources leading from defined 302 to in-use 310. State transition 318 represents the transfer of reserved host resources leading from in-use 310 to in-use-reserved 306, and the transfer of not-reserved host resources leading from in-use-reserved 306 to in-use 310. State transition 320 represents the shutdown of a resource consumer, leading from in-use-reserved 306 to activated 308, and represents the startup of a resource consumer leading from activated 308 to in-use-reserved 306. State transition 322 represents the shutdown of a resource consumer leading from in-use 310 to can-be-de-allocated 312, and represents the startup of a resource consumer leading from can-be-de-allocated 312 to in-use 310. State transition 324 represents the preparations for allocation of host resources (i.e., resource reserved) leading from can-be-de-allocated 312 to activated 308, as well as the preparations for de-allocation of host resources (i.e., unreserved resource consumer) leading from activated 308 to can-be-de-allocated 312. State transition 326 represents deactivation and de-allocation of host resources which resource manager 110 performs. Additionally, resource manager 110 reassigns the host resources to virtual resources of another resource consumer.

Figure 3B:
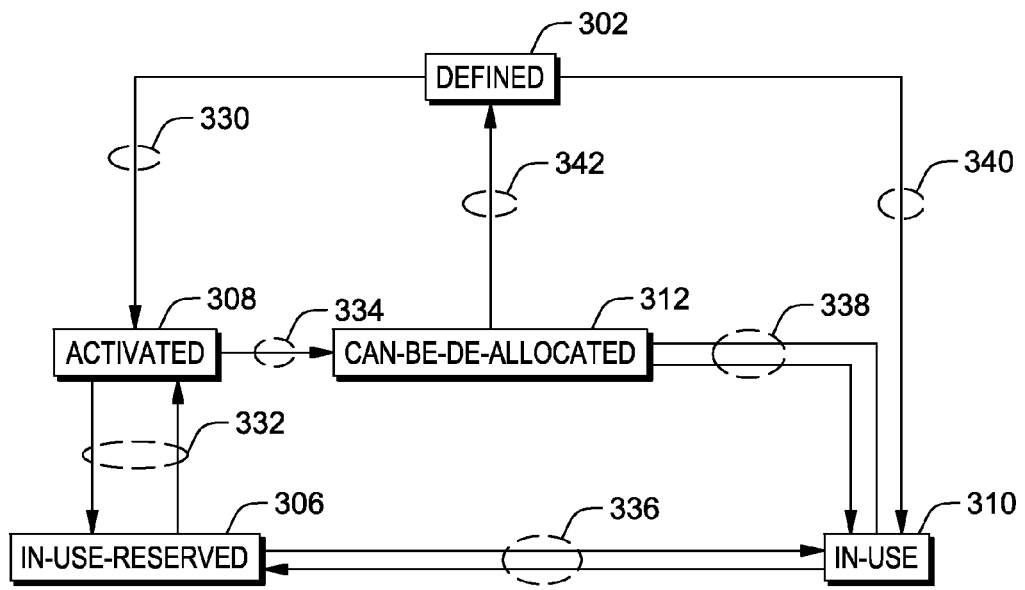
FIG. 3B illustrates another state diagram depicting resource states and state transitions, in accordance with one embodiment of the present invention.

FIG. 3B illustrates another state diagram depicting resource states and state transitions, in accordance with one embodiment of the present invention.

In this embodiment, an alternative implementation is presented, where resource manager 110 performs host resource allocation with subsequent host resource activation. Such an implementation accelerates the activation of the resource consumer, more particularly, the first resource consumer activation. For subsequent resource consumer activations, resource manager 110 can utilize a lazy deactivation and de-allocation strategy. States and state transitions for the virtual resources of a resource consumer are represented in FIG. 3B. The states and state transitions represent resource manager 110 performing allocation (without activation) when a resource consumer is set to resource reserved. Resource manager 110 also performs lazy de-allocation when a resource consumer is not set to resource reserved. In instances where a resource consumer is marked as reserved, host resources stay allocated and activated. In this embodiment, there is no state, allocated 304, as described previously with reference to FIG. 3A. Resource manager 110 transfers a host resource set to reserved to activated 308 rather than to allocated 304.

State transition 330 represents the allocation and activation of host resources (i.e., resource reserved) leading from defined 302 to activated 308, and state transition 340 represents the allocation and activation of host resources (i.e., resource unreserved) leading from defined 302 to in-use 310. State transition 332 represents the shutdown of a resource consumer leading from in-use-reserved 306 to activated 308, and represents the startup of a resource consumer leading from activated 308 to in-use-reserved 306. State transition 334 represents preparations for de-allocation of host resources (i.e., unreserved resource consumer) leading from activated 308 to can-be-de-allocated 312. State transition 336 represents the allocation of host resources (i.e., resource unreserved) leading from in-use 310 to in-use-reserved 306, as well as, the preparations for de-allocation of host resources (i.e., resource unreserved) leading from in-use-reserved 306 to in-use 310.

State transition 338 represents the shutdown of a resource consumer leading from in-use 310 to can-be-de-allocated 312, and represents the startup of a resource consumer leading from can-be-de-allocated 312 to in-use 310. State transition 342 represents the deactivations and de-allocation/reallocation of host resources which resource manager 110 performs. Additionally, resource manager 110 reassigns the host resources to virtual resources of another resource consumer.

The lazy de-allocation strategy includes allocating resources to a resource consumer, where utilization of host resources is based on the availability of the host resources (i.e., host resources that are not assigned to any resource consumer). However, in a situation where there are no unassigned host resources, resource manager 110 attempts to de-allocated host resources from other resource consumers which are not active and not set to "resource reserved". However, de-allocating a host resource from another resource consumer can result in the resource consumer not being able to start. Resource manager 110 can utilize a strategy for de-allocating which minimizes the number of resource consumers that do not start. As a result, resource manager 110 attempts to de-allocate as few host resources as possible, and in a situation where there are resource consumers that cannot start, resource manger 110 can de-allocate the host resources for one of the resource consumers that cannot start, thus increasing the number of host resources available, and reducing the number of requests to obtain host resources from other resource consumers.

Another strategy can include anticipatory allocation and activation at definition time. Resource manager 110 can allocate and activate host resources subsequent to receiving the virtual resource definitions. In this strategy, a reservation mechanism is not utilized for the controlling of host resource allocations, and the degree of host resource over-commitment is reduced. Host resource over-commitment is the ratio between the number of required host resources to fulfill requirements of virtual resource definitions and the number of host resources that are actually available to fulfill requirements of the virtual resource definitions. Resource manager 110 performs anticipatory allocations and activations as soon as the host resources required for a resource consumer become available. Resource manager 110 performs lazy de-allocation when host resources are required by another resource consumer that is active, is to be active, or is defined with a higher priority.

Figure 4:
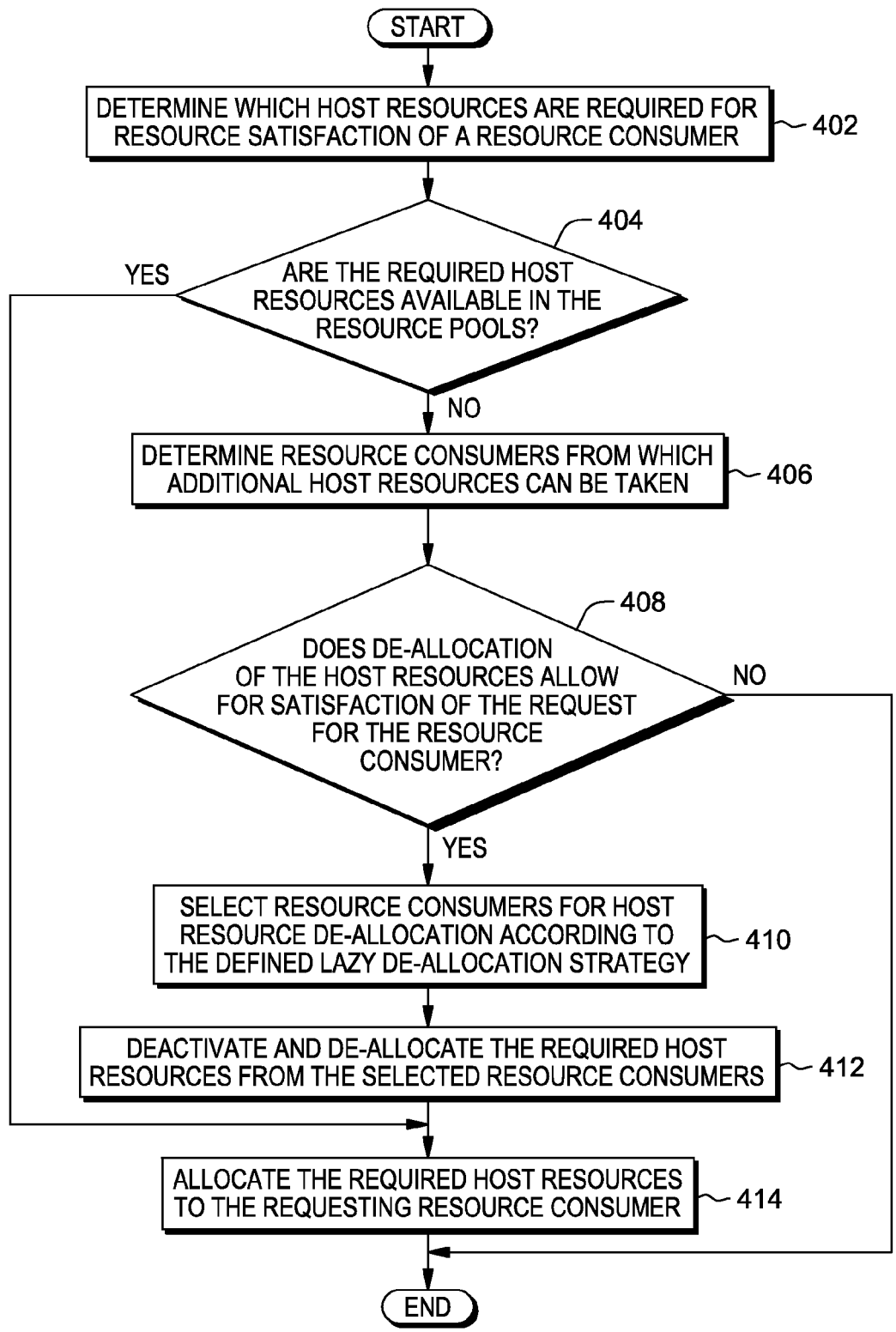
FIG. 4 is a flowchart depicting operational steps of a resource manager for selecting a candidate for lazy de-allocation, in accordance with an embodiment of the present invention.

FIG. 4 is a flowchart depicting operational steps of a resource manager for selecting a candidate for lazy de-allocation, in accordance with an embodiment of the present invention.

Resource manager 110 determines which host resources are required for resource satisfaction of a resource consumer (step 402). In this embodiment, resource manager 110 determines the host resources required according to the virtual resource definitions for the resource consumer. Resource manger 110 can request the virtual resource definitions to obtain a list of required host resources for resource satisfaction of the resource consumer.

Resource manager 110 determines if all host resources are available in resource pools (decision step 404). In the event resource manager 110 determines not all the host resources are available in the resource pools ("no" branch, step 404), resource manager 110 determines resource consumers from which additional host resources can be taken (step 406). In the event resource manager 110 determines that all the host resource are available in the resource pools ("yes" branch, step 404), resource manager 110 allocates the required host resources to the requesting resource consumer (step 414).

Resource manager 110 determines resource consumers from which additional host resources can be taken (step 406). In this embodiment, resource manager 110 identifies other resource consumers according to criteria that include resource consumers that are not active and do not have reserved host resources which cannot be de-activated and de-allocated. By identifying the other resource consumers according to the criteria, resource manager 110 determines which host resources can be taken that may possibly satisfy resource requirements of the requesting resource consumer.

Resource manager 110 determines if the de-allocations of the host resources allow for satisfaction of the request for the resource consumer (decision step 408). In the event resource manager 110 determines the de-allocation of the host resources allows for satisfaction of the request for the resource consumer ("yes" branch, step 408), resource manager 110 selects resource consumers for host resource de-allocation according to the defined lazy de-allocation strategy (step 410). In the event resource manager 110 determines the de-allocation of the host resources does not allow for satisfaction of the request for the resource consumer ("no" branch, step 408), resource manager 110 denies the request for the resource consumer and selection of a candidate for lazy de-allocation ceases.

Resource manager 110 selects resource consumers for host resource de-allocation according to the defined lazy de-allocation strategy (step 410). As previously discussed, the lazy de-allocation strategy includes allocating resources to a resource consumer, where utilization of host resources is based on the availability of the host resources. Resource manager 110 can select resource consumers based on priority of each of the resource consumer and a period of time a resource consumer has not been active. Resource manager 110 selects host resources of the resource consumers that are not active and not set to "resource reserved".

Resource manager 110 deactivates and de-allocates the required host resources from the selected resource consumers (step 412), and subsequently, resource manager 110 allocates the required host resources to the requesting resource consumer (step 414).

Figure 5:
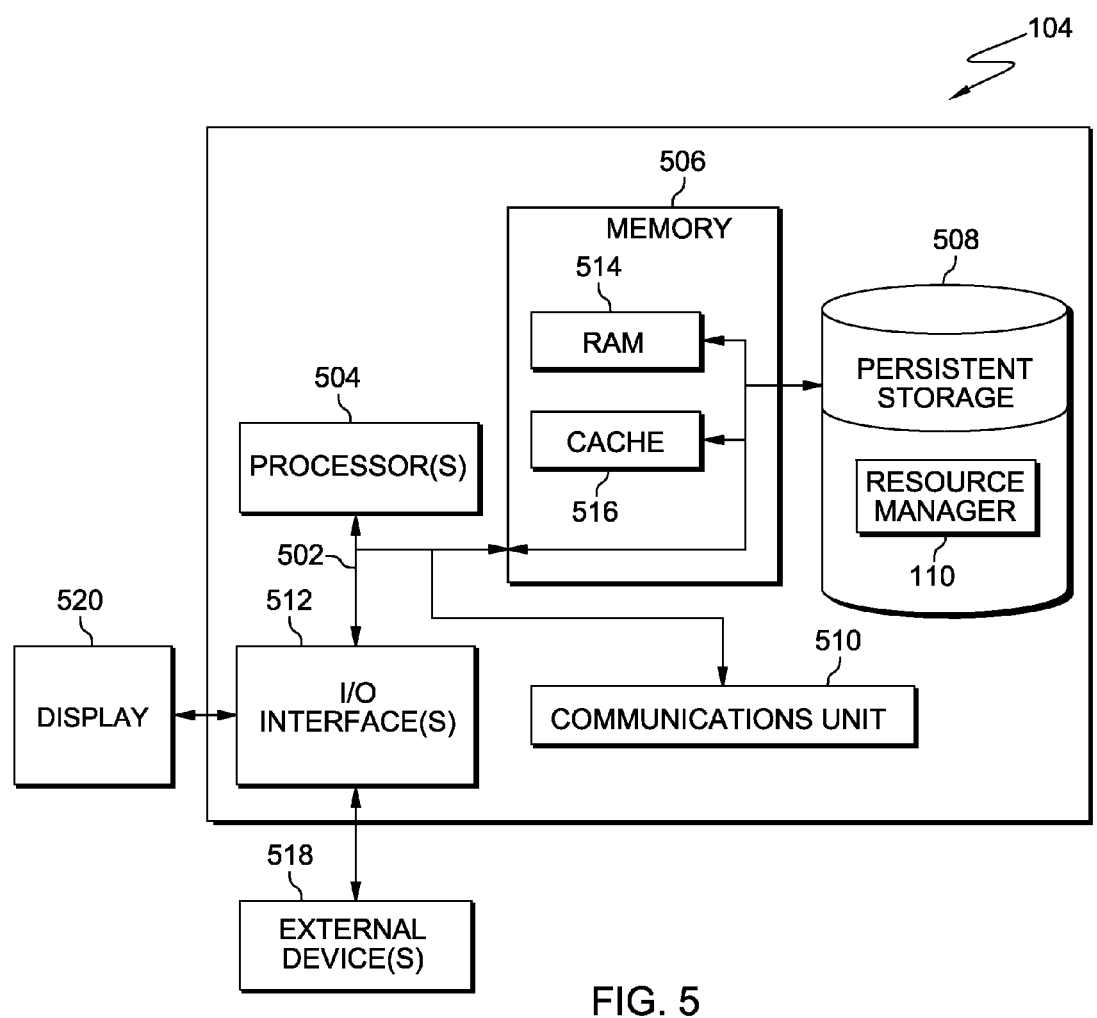
FIG. 5 is a block diagram of components of a computer system, such as the computer server of FIG. 1, in accordance with an embodiment of the present invention.

FIG. 5 depicts a block diagram of components of a computer, such as management console 104, hosting resource manager 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Management console 104 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer readable storage device.

Resource manager 110 is stored in persistent storage 508 for execution by one or more of computer processors 504 via one or more memories of memory 506. In this embodiment, persistent storage 508 includes a magnetic hard disk drive. Alternatively, or in addition to a magnetic hard drive, persistent storage 508 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including systems and devices within or controlled by management console 104. In these examples, communications unit 510 includes one or more wireless network interface cards. Communications unit 510 may provide communications through the use of either or both physical and wireless communications links. Computer programs and processes, such as resource manager 110, may be downloaded to persistent storage 508 through communications unit 510, or uploaded to another system through communications unit 510.

I/O interface(s) 512 allows for input and output of data with other devices that may be connected to management console 104. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 may also connect to a display 520. Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for managing resources in a server environment, the computer program product comprising:
one or more computer readable tangible storage media and program instructions stored on at least one of the one or more storage media, the program instructions comprising:
program instructions to determine to deactivate a first resource consumer, wherein a first virtual resource with a first set of one or more host resources remains assigned to the deactivated first resource, wherein the first set of one or more host resources of the first resource consumer includes at least host resources that are not active and do not have host resource reserves;
program instructions to determine if a second virtual resource assigned to a second resource consumer requires the first set of one or more host resources;
program instructions to, responsive to determining the second virtual resource assigned to the second resource consumer does not require the first set of one or more host resources, determine not to deactivate the one or more host resources assigned to the first virtual resource;
program instructions to determine a second set of one or more host resources is required to satisfy a third resource consumer; and program instructions to, responsive to determining the second set of one or more host resources is available, determine to utilize the first set of one or more host resources of the first resource consumer for the required second set of one or more host resources.

2. The computer program product of claim 1, further comprising program instructions, stored on the one or more computer readable storage media, which when executed by a processor, cause the processor to:

responsive to determining a second virtual resource assigned to a second resource consumer requires the first set of one or more host resources, deactivate the first set of one or more host resources assigned to the first virtual resource; and de-allocate the first set of one or more host resources assigned to the first virtual resource.

3. The computer program product of claim 1, wherein program instructions to determine the second set of one or more host resources is available is based at least on a resource consumer priority assignment associated with the second set of one or more resources.

4. The computer program product of claim 3, further comprising program instructions, stored on the one or more computer readable storage media, which when executed by a processor, cause the processor to:

determine if the first set of one or more host resources satisfy the third resource consumer; and responsive to determining the first set of one or more host resources satisfies the third resource consumer, de-allocate the first set of one or more host resources.

5. The computer program product of claim 4, further comprising program instructions, stored on the one or more computer readable storage media, which when executed by a processor, cause the processor to:

deactivate the first set of one or more host resources; and allocate the first set of one or more host resources to the third resource consumer.

6. A computer system for managing resources in a server environment, the computer system comprising:

one or more computer processors;

one or more computer readable storage media; and program instructions stored on the computer readable storage media for execution by at least one of the one or more computer processors, the program instructions comprising:

program instructions to determine to deactivate a first resource consumer, wherein a first virtual resource with a first set of one or more host resources remains assigned to the deactivated first resource, wherein the first set of one or more host resources of the first resource consumer includes at least host resources that are not active and do not have host resource reserves;

program instructions to determine if a second virtual resource assigned to a second resource consumer requires the first set of one or more host resources;

program instructions to, responsive to determining the second virtual resource assigned to the second resource consumer does not require the first set of one or more host resources, determine not to deactivate the one or more host resources assigned to the first virtual resources;

program instructions to determine a second set of one or more host resources is required to satisfy a third resource consumer; and program instructions to, responsive to determining the second set of one or more host resources is available, determine to utilize the first set of one or more host resources of the first resource consumer for the required second set of one or more host resources.

7. The computer system of claim 6, further comprising program instructions, stored on the one or more computer readable storage media, which when executed by a processor, cause the processor to:

responsive to determining a second virtual resource assigned to a second resource consumer requires the first set of one or more host resources, deactivate the first set of one or more host resources assigned to the first virtual resource; and de-allocate the first set of one or more host resources assigned to the first virtual resource.

8. The computer system of claim 6, wherein program instructions to determine the second set of one or more host resources is available is based at least on a resource consumer priority assignment associated with the second set of one or more resources.

9. The computer system of claim 8, further comprising program instructions, stored on the one or more computer readable storage media, which when executed by a processor, cause the processor to:

determine if the first set of one or more host resources satisfies the third resource consumer; and responsive to determining the first set of one or more host resources satisfies the third resource consumer, de-allocate the first set of one or more host resources.

10. The computer system of claim 9, further comprising program instructions, stored on the one or more computer readable storage media, which when executed by a processor, cause the processor to:

deactivate the first set of one or more host resources; and allocate the first set of one or more host resources to the third resource consumer.

* * * * *